(12) United States Patent
Cho et al.

(10) Patent No.: US 8,802,255 B2
(45) Date of Patent: Aug. 12, 2014

(54) SECONDARY BATTERY AND ITS METHOD OF MANUFACTURE

(75) Inventors: Sungjae Cho, Yongin-si (KR); Sangsok Jung, Yongin-si (KR); Masanori Kogure, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 1787 days.

(21) Appl. No.: 11/646,485

(22) Filed: Dec. 28, 2006

(65) Prior Publication Data

US 2007/0154782 A1    Jul. 5, 2007

(30) Foreign Application Priority Data

Dec. 29, 2005    (KR) .......................... 10-2005-0134526

(51) Int. Cl.
  *H01M 2/12*    (2006.01)
  *H01M 2/00*    (2006.01)
  *H01M 6/12*    (2006.01)

(52) U.S. Cl.
  USPC ................ 429/56; 429/82; 429/162; 429/163

(58) Field of Classification Search
  USPC ................ 429/56, 164, 175, 53, 82, 162, 163
  See application file for complete search history.

(56) References Cited

FOREIGN PATENT DOCUMENTS

| JP | 09245839 | * | 9/1997 | ............ H01M 10/40 |
| JP | 2004079399 | A | 3/2004 | |
| JP | 2005332700 | A | 12/2005 | |
| JP | 2005346966 | A | 12/2005 | |
| KR | 1020000021323 | A | 4/2000 | |
| KR | 1020030066963 | * | 8/2003 | ............ H01M 2/04 |
| KR | 10-2003-0066963 | A | 3/2006 | |

* cited by examiner

*Primary Examiner* — Muhammad Siddiquee
(74) *Attorney, Agent, or Firm* — Robert E. Bushnell, Esq.

(57) ABSTRACT

A secondary battery has a depression having a thickness less than that of other portions of the periphery of a cap plate or a can. The depression includes a rupture section having a smallest thickness in the depression and further includes wrinkles between the rupture section and the periphery of the depression. Furthermore, the secondary battery is manufactured by a method including: a first coining step of forming the thickness of some portions of the cap plate or the can to be less than that of other peripheral portions thereof; a second coining step of forming wrinkles on the periphery of some portions where the first coining has been performed; and a third coining step of forming a rupture section having the smallest thickness in the depression on an inner side of the wrinkles.

3 Claims, 4 Drawing Sheets

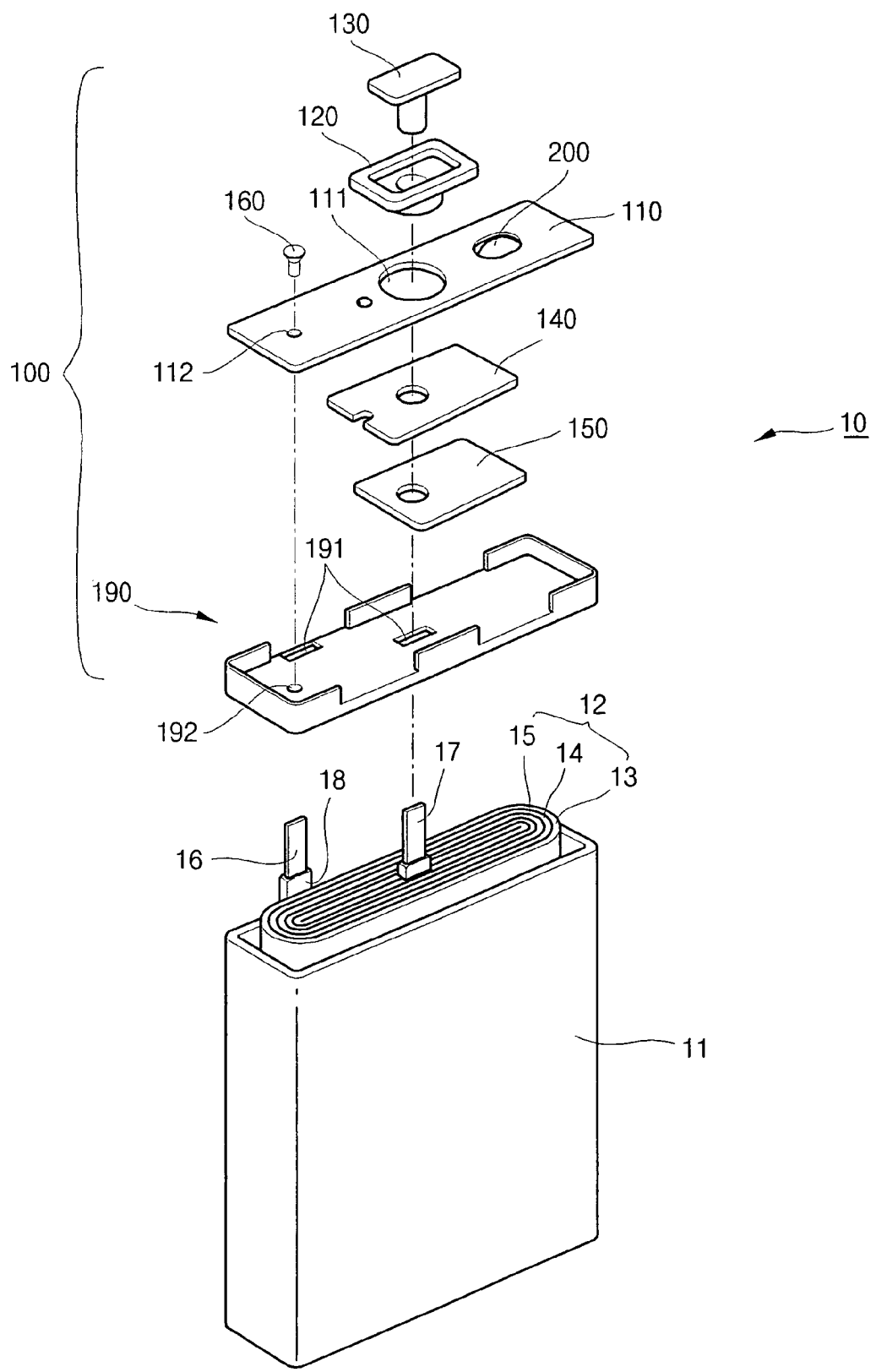

SECONDARY BATTERY AND ITS METHOD OF MANUFACTURE

CLAIM OF PRIORITY

This application makes reference to, incorporates the same herein, and claims all benefits accruing under 35 U.S.C. §119 from an application for SECONDARY BATTERY AND METHOD THE SAME earlier filed in the Korean Intellectual Property Office on the 29 day of December 2005 and there duly assigned Serial No. 10-2005-134526.

BACKGROUND OF THE INVENTION

1. Field of the Invention

The present invention relates to a secondary battery and its method of manufacture, and more particularly, the present invention relates to a secondary battery, and its method of manufacture, which can absorb external shocks by forming wrinkles between a rupture section and a periphery of a depression formed in a cap plate or a can, and thus prevent damage of the depression due causes other than the internal gas pressure of the battery.

2. Description of the Related Art

Generally, unlike a primary battery which can not be charged, a secondary battery is a battery in which charging and discharging can be performed, and is widely used in state-of-the-art fields, such as cellular phones, notebook computers, camcorders and so on. In particular, since a lithium secondary battery operates at 3.6V, which is three times the operating voltage of a nickel-cadmium battery or a nickel-hydrogen battery which are widely used as a power source for electronic equipment, and since the energy density per unit weight is very high, lithium secondary batteries are being widely used.

Such a lithium secondary battery mainly uses a lithium-system oxide as a positive electrode active material, and an elastic material as a negative electrode active material. Furthermore, the lithium secondary battery can be formed in various shapes, such as a cylindrical shape, a polygonal shape, and a pouch shape.

Of these shapes, a polygonal shaped secondary battery includes an electrode assembly, a can into which the electrode assembly is contained, and a cap assembly connected to the can.

The electrode assembly is composed of a negative electrode, an positive electrode and a separator wound between them, and a negative electrode tab and a positive electrode tab are respectively drawn out from the positive electrode and the negative electrode.

The can is a metal container having an approximately rectangular parallelepiped shape for a polygonal shaped secondary battery, and is formed by a processing method such as a deep drawing and so on.

The cap assembly is composed of a cap plate connected to the upper side of a can, an electrode terminal which is formed via a terminal through hole, and on the external side of which a gasket is arranged for insulation from the cap plate, an insulation plate arranged on the lower side of the cap plate, and a terminal plate arranged on the lower side of the insulation plate for allowing the current to flow to the electrode terminal.

The electrode assembly is electrically connected to the electrode terminal via the negative electrode tab and the terminal plate, and the positive electrode is electrically connected to the cap plate or the can via the positive electrode tab.

On the other hand, a depression is formed on one side of the cap plate. Since this depression is formed to be thinner than other portions around it, it is preferentially ruptured when the internal pressure of a battery increases due to overcharging, and thus, the gas is discharged, thereby protecting the battery. Such a depression is classified as a clad depression and a press depression according to its formation method.

However, a conventional depression has a following problem.

Generally, the thickness of a cap plate is 0.8-1.0 mm, the thickness of a cap plate at the site where the depression is formed is 70 nm, and the thickness of a cross-section where damage is expected in the depression when a problem occurs in a battery is merely 20-30 nm.

As described above, the depression is originally ruptured due to the internal pressure of a battery, and thus performs a function to protect the battery. However, since the thickness of the rupture section in the depression is merely several-tens of nano meters, a crack can occur in the rupture section due to even small external shocks or the rupture section can be ruptured. That is, the depression section can be ruptured, and the reliability of the battery reduced.

SUMMARY OF THE INVENTION

The present invention is conceived to solve this problem and an object of the present invention is to prevent damage of a depression due to other factors except for the internal pressure of a battery by absorbing external shocks by forming wrinkles between a rupture section and a periphery of a depression formed in a cap plate or a can.

In order to accomplish the above object, the secondary according to one aspect of the present invention includes an electrode assembly, a can into which the electrode assembly is contained, and a cap assembly including a cap plate connected to the open upper side of the can, A depression having a thickness less than that of other portions around the cap plate or the can is formed. The depression includes a rupture section having a smallest thickness in the depression and further includes wrinkles between the rupture section and a periphery of the depression.

The depression can be formed by applying a pressure and molding.

Furthermore, the wrinkles are configured to form a closed curve line along the inner side of the periphery.

Moreover, the wrinkles are formed to define a convex shape protruding toward outside.

A method of manufacturing a secondary battery according to another aspect of the present invention for accomplishing above object includes forming a depression having a thickness less than that of other portions along the periphery of a cap plate or a can of the secondary battery, and includes the first coining step of forming the thickness of some portions of the cap plate or the can to be less than that of other peripheral portions thereof; a second coining step of forming wrinkles on a periphery of some portions which the first coining has been performed; and a third coining step of forming a rupture section having the smallest thickness in the depression on an inner side of the wrinkles.

The wrinkles are formed by performing the second coining step on all areas except for the periphery of the portions to which the first coining step has been performed.

The wrinkles are further formed by performing the second coining step on an area between a middle section and a periphery portion of the portions which the first coining step has been performed.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein:

FIG. 1 is an exploded perspective view of a secondary battery according to an embodiment of the present invention.

FIG. 2b is a partially enlarged plane view of a depression of the secondary battery of FIG. 2a.

FIG. 3b is a partially enlarged plane view of a depression of the secondary battery of FIG. 3a.

DETAILED DESCRIPTION OF THE INVENTION

Figure 2A:
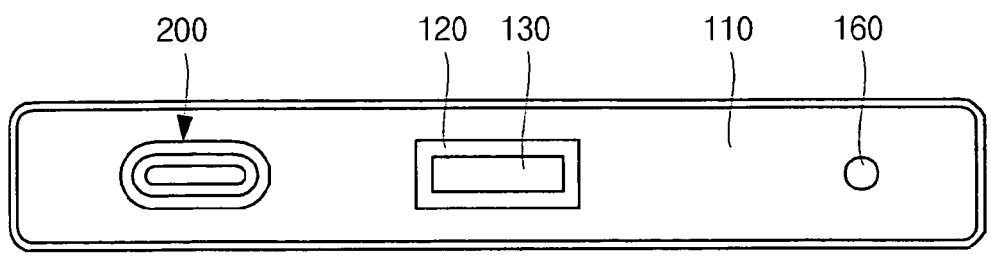
FIG. 2a is a plane view of the secondary battery according an embodiment of the present invention.

Hereinafter, exemplary embodiments of the present invention are explained in detail below, referring to the attached drawings. Furthermore, the following embodiments explain only the formation of a depression. However, the same discussion can also be applied to a depression formed in the can.

FIG. 1 is an exploded perspective view of a secondary battery according to an embodiment of the present invention. Referring FIG. 1, the secondary battery includes an electrode assembly 12, a can 11 into which the electrode assembly 12 is contained, and a cap assembly 100 connected to the can 11.

In the electrode assembly, generally, a negative electrode 15 and an positive electrode 13 are formed as wide plate electrodes, a separator 14 is inserted and stacked between the negative electrode 15 and the positive electrode 13 to insulate them, and a "Jelly Roll" electrode assembly is then formed by helical winding so that the electrical capacity can be increased. The negative electrode 15 and the positive electrode 13 can be formed by respectively coating carbon, a negative electrode active material, a cobalt oxide lithium, and a negative electrode active material, on each of the current-collecting bodies which are respectively formed of a copper foil and an aluminum foil. The separator 14 is formed of polyethylene, polypropylene, or a co-polymer of polyethylene and polypropylene. If the separator 14 is formed to be wider than the positive electrode 13 and the negative electrode 15, it is very useful for preventing shorts between the electrodes. In the electrode assembly 12, a positive electrode tab 16 and a negative electrode tab 17 respectively connected to each electrode is drawn out. Around the positive electrode tab 16 and the negative electrode tab 17, an insulation tape 18 is wound at the border portion drawn out to the outside of the electrode assembly 12 for preventing shorts between the negative electrode 15 and the positive electrode 13.

As described above, the can 11 is a metal container having an approximately rectangular parallelepiped shape for a polygonal shaped secondary battery, and is formed by a processing method such as deep drawing and so on. Therefore, it is possible for the can itself to function as a terminal. It is preferable that a light weight conductive metal, such as aluminum or an aluminum alloy, is employed as a material for forming the can. The can 11 is a container for receiving the electrode assembly 12 and the electrolyte, and the open upper side thereof is sealed by the cap assembly 100 for allowing the electrode assembly 12 to be put into the inside.

The cap assembly 100 is composed of a cap plate 110, an electrode terminal 130, an insulation plate 140, and a terminal plate 150. A terminal through hole 111 is formed on the cap plate 110, and the electrode terminal 130 is arranged such that it can penetrate through the terminal through hole 111 while the electrode terminal 130 is positioning a gasket 120 on the exterior surface thereof for insulation from the cap plate 110. The insulation plate 140 is arranged on the lower side of the cap plate 110, and the terminal plate 150 is arranged on the lower side of the insulation plate 140. The terminal plate 150 is connected to the lower end portion of the electrode terminal 130.

The negative electrode 15 of the electrode assembly 12 is electrically connected to the electrode terminal 130 via the negative electrode tab 17 and the terminal plate 150. For the positive electrode 13 of the electrode assembly 12, the positive electrode tab 16 is welded to the cap plate 110 or the can 11. An insulation case 190 can further be arranged on the lower side of the terminal plate 150. On the other hand, it is possible to design a battery by changing the polarities.

An electrolyte injection hole 112 is formed on one side of the cap plate 110 for injecting the electrolyte into the can 11, and a sealing unit 160 for sealing the electrolyte injection hole 112 is formed after injecting the electrolyte.

Furthermore, a depression 200 is formed in the cap plate 110, and this depression 200 is explained in detail as follows.

Figure 2B:
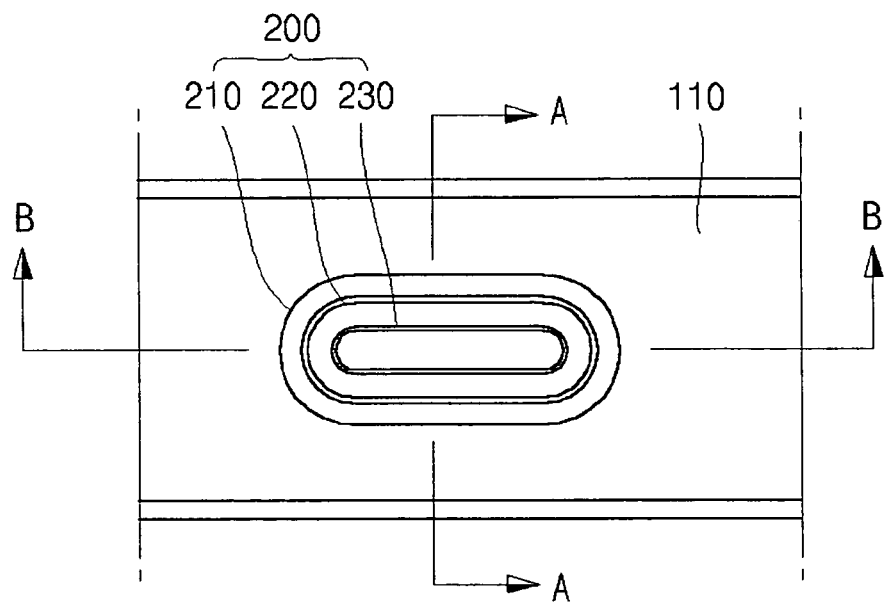
Figure 2C:
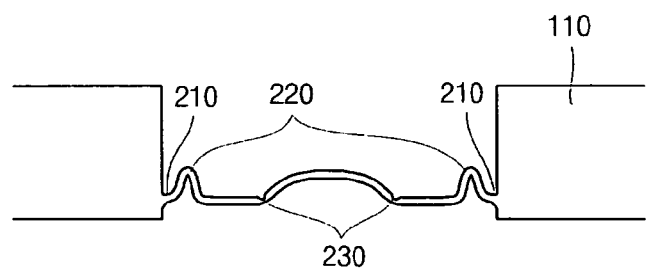
FIG. 2c is a A-A sectional view of the depression of FIG. 2b.
Figure 2D:
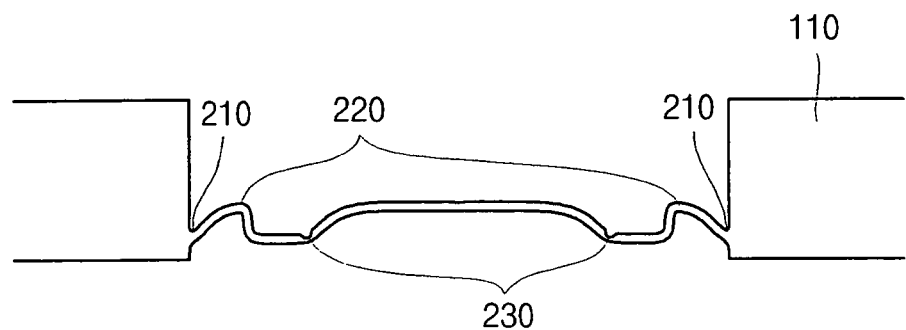
FIG. 2d is a B-B sectional view of the depression of FIG. 2b.

FIG. 2a is a plane view of the secondary battery according an embodiment of the present invention, FIG. 2b is a partially enlarged plane view of a depression of the secondary battery of FIG. 2a, FIG. 2c is a A-A sectional view of the depression of FIG. 2b, and FIG. 2d is a B-B sectional view of the depression of FIG. 2b.

Referring to the drawings, the secondary battery according an embodiment of the present invention includes a depression 200 having a thickness less than the thickness of other portions around the cap plate 110. The depression 200 includes a rupture section 230 having the smallest thickness in the depression 200 and further includes wrinkles 220 between the rupture section 230 and the periphery 210 of the depression.

When the pressure increases due to the gas within the battery upon overcharging, the depression 200 is preferentially ruptured, then the gas is discharged, and thus preventing damage to the battery.

The depression 200 is thinner than other portions of the cap plate 110, and can be formed by a pressure molding. That is, in the present embodiment, the depression is a press type depression since the manufacturing cost of a press type depression is lower than that of a clad type depression. However, the present invention is not limited to this.

Since the rupture section 230 is the thinnest in the depression 200, it is the portion where damage occurs earliest due to the internal pressure of a battery. As illustrated in the drawings, the rupture section 230 is a portion where a groove is formed on the external surface (the upper side) and inner surface (the lower side) of the depression 200.

The present invention is characterized in which the wrinkles 220 are formed between the rupture section 230 and the periphery 210 of the depression. The periphery 210 is a demarcation line for classifying the portions where the depression is formed in the cap plate 110, and the portions where the depression 200 is not formed in the cap plate 110.

The wrinkles 220 can absorb external shocks applied to the depression 200, and thus prevent the depression 200 from being ruptured. That is, these wrinkles 220 prevent damage to the depression 200 due to factors other than the internal pressure of the battery.

These wrinkles 220 are formed between the rupture section 230 and the periphery 210 of the depression. In reviewing the results of external shocks being applied to the depression 200, it was learned that the shocks are applied from the external side of the depression 200 to the inner side thereof. In short, the shocks are transferred from the periphery 210 of the depression 200 to the rupture section 230 via the wrinkles 220. Therefore, unlike the conventional technology, the external shocks are not directly applied to the rupture section 230, and since the shocks must pass through the wrinkles 220 functioning as a buffer, they can prevent the rupture section 230 from being ruptured due to the external physical shocks.

Formation of the wrinkles 220 does not interfere with the inherent function of the depression 200. As described above, the inherent function of the depression 200 is to rupture due to the internal pressure of the battery. Therefore, according to the present invention, a depression 200 which can perform the inherent function normally and exhibits very excellent shockproof property is provided.

Referring to FIG. 2b, the wrinkles 220 are configured to form a closed curve line along the inner side of the periphery 210 of the depression. Therefore, the wrinkles 220 are formed such that they can enclose all pathways through which the external shocks are transferred from the periphery 210 of the depression to the rupture section 230, and thus the shock absorbing effect is excellent. On the other hand, the rupture portion 230 is configured to form a closed curve line along the inner side of the wrinkles 220.

Referring to FIG. 2c and FIG. 2d, the wrinkles 220 are the recessed portion formed as convex shape projecting toward the outside direction (in the upper direction in the drawings) of the depression 200. This means that the pressure molding process can be performed from the upper direction of the depression 200. In short, the wrinkles 220 can be formed at the periphery of the depression 200 by applying pressure to the portions except for the wrinkled portions of the upper surface of the depression 200 by placing a support frame in the lower side of the depression 200.

Figure 3A:
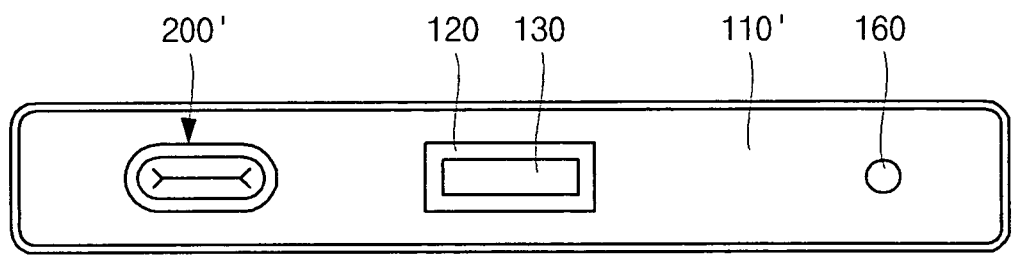
FIG. 3a is a plane view of a secondary battery according another embodiment of the present invention.
Figure 3B:
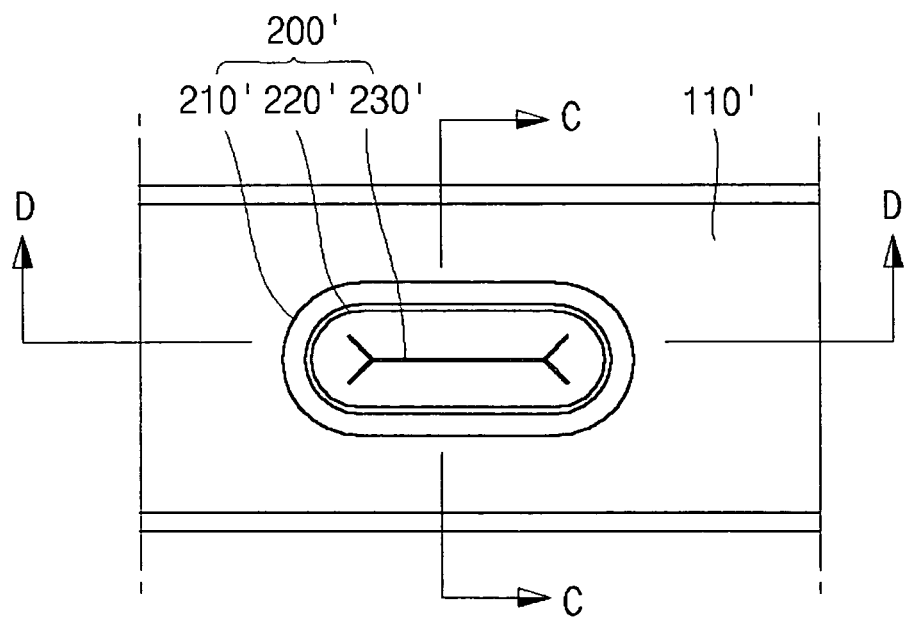
Figure 3C:
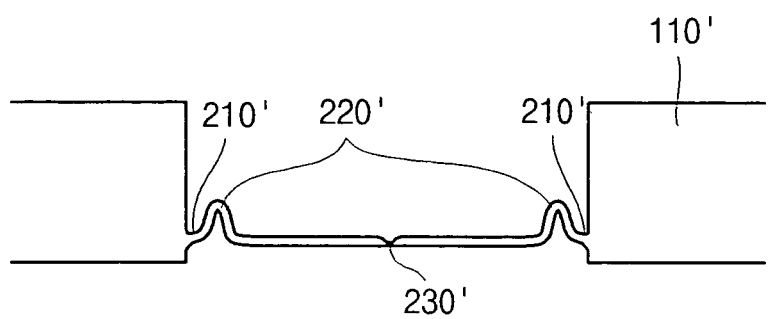
FIG. 3c is a C-C sectional view of the depression of FIG. 3b.
Figure 3D:
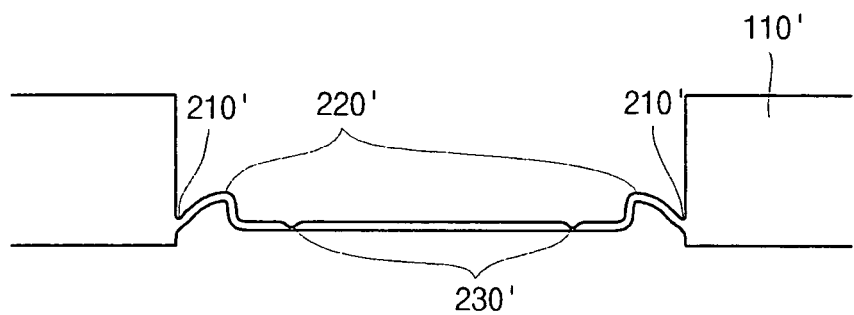
FIG. 3d is a D-D sectional view of the depression of FIG. 3b.

On the other hand, FIG. 3a is a plane view of a secondary battery according another embodiment of the present invention. FIG. 3b is a partially enlarged plane view of a depression of the secondary battery of FIG. 3a. FIG. 3c is a C-C sectional view of the depression of FIG. 3b, and FIG. 3d is a D-D sectional view of the depression of FIG. 3b.

Referring to the drawings, the secondary battery according another embodiment of the present invention includes a depression 200' having a thickness less than the thickness of other portions around the cap plate 110'. The depression 200' includes a rupture section 230' having the smallest thickness in the depression 200', and further includes wrinkles 220' between the rupture section 230' and the periphery 210' of the depression.

In the present embodiment, the rupture section 230' has a ">--<" shape along the inner side of the wrinkles 220'. Since the discussion of the embodiment described above can be applied to the present embodiment except for the discussion of the rupture section 230', a more detailed discussion thereof has been omitted.

The present invention is not limited to the shapes of the rupture section described above for the two embodiments.

Hereinafter, a method of manufacturing the secondary battery according to another aspect of the present invention is explained in detail below. Furthermore, in the following embodiment, only a depression formed in the cap plate is discussed. However, the same discussion can be applied to a depression formed in the can.

A method of manufacturing a secondary battery according to another aspect of the present invention for accomplishing above object includes forming a depression having a thickness less than the thickness of other portions along the periphery of a cap plate or a can of a secondary battery, and includes a first coining step of forming the thickness of some portions of the cap plate or the can to be less than the thickness of other peripheral portions; a second coining step of forming wrinkles on the periphery of some portions to which the first coining has been applied; and a third coining step of forming a rupture section having the smallest thickness in the depression on the inner side of the wrinkles.

The first coining is a process of applying a pressure until the thickness of some portions of the cap plate reaches a predetermined thickness (for example, 65-75 μm). After the first coining, the portion where a depression is formed in the cap plate, and the portion where a depression is not formed in the cap plate can be differentiated. The first coining is realized by applying a pressure to and molding the upper side of some portions of the cap plate after holding the lower side of the cap plate tightly with a support frame.

The second coining is a process of applying a pressure until the thickness of the cap plate of some parts of the portions to where the first coining has been applied reaches a predetermined thickness, (for example, 45-55 μm). After the second coining, wrinkles are formed along the periphery of the portions to where the first coining has been applied.

In order to form the wrinkles, the second coining is performed by applying a pressure from the upper direction to all areas except for the periphery of the portions to which the first coining has been applied after holding the lower side of the cap plate tightly with a support frame, or by applying a pressure from the upper direction to an area between the periphery and the middle section of the portions to where the first coining has been applied.

That is, since the thickness of the portions affected by applying a pressure to some parts of the portions to where the first coining has been applied is reduced, the materials of the cap plate shift to the periphery, and thus, wrinkles are formed along the periphery.

Furthermore, the third coining is a process of applying a pressure until the thickness of some portions of the cap plate inside the wrinkles reaches a predetermined thickness (for example, 20-30 μm). After the third coining, a rupture section having the smallest thickness is formed in the depression.

It is preferable that the third coining is performed for some parts of the portions where the second coining has been applied. It is preferable for the third coining to be applied to the portions where the second coining has been applied in terms of brittleness, as compared to the third coining being applied to only portions where the second coining has not been performed but only where the first coining has been performed, since there is a possibility that cracks can occur.

The third coining can be performed by applying a pressure to and molding the upper side of the cap plate of some portions inside the wrinkles after holding the lower side of the cap plate tightly with a support frame. In this case, the first coining and the third coining are all applied to the upper side of the cap plate after holding the lower side of the cap plate tightly with a support frame, and thus continuous processes can be easily performed. However, the present invention is not limited to this, and the third coining can be performed by applying a pressure to and molding the lower side of the cap plate.

Since the secondary battery according to the present invention can absorb external shocks by forming wrinkles between a rupture section and the periphery of a depression formed in a cap plate or a can, damage to a depression due to causes other than the internal gas pressure of the battery can be prevented.

The present invention is explained referring to the described embodiments. However, these are only examples, and it is to be understood that various kinds of modifications and other equivalent embodiments can be implemented by those skilled in the art to which the present invention belongs. For example, according to the embodiments of the present invention discussed above, a depression is provided in the cap plate. However, identical structure and effects can be acquired when a depression is formed in the can.

What is claimed is:

1. A secondary battery, comprising:
    an electrode assembly;
    a can to contain the electrode assembly;
    a cap assembly including a cap plate attached to an open upper side of the can;
    a depression, arranged on either the cap plate or the can, the depression having a thickness less than a thickness of other portions of the cap plate or the can where the depression is arranged; and
    the depression further comprising:
        a flat section positioned within the center of the depression, the flat section being entirely flat and lying in a geometric plane of the cap plate;
        a rupture section entirely contained within the flat section having a thickness less than a thickness of other portions of the depression; and
        wrinkles entirely surrounding the flat section and arranged between and coupled to the flat section and a periphery of the depression, said flat section being of greater width than said wrinkles and said wrinkle having a height greater than a height of the flat section,
    wherein the rupture section has a ">--<" shape along an inner side of the wrinkles; and
    wherein the cap plate or the can has an upper and a lower side, the lower side being closer to an inner portion of the battery, wherein the depression is formed at the lower side; and
    wherein the wrinkles have a convex shape only, protruding outward from the cap plate or the can where the depression is arranged.

2. The secondary battery according to claim 1, wherein the depression is formed by applying a pressure and molding.

3. The secondary battery according to claim 1, wherein the wrinkles define a closed curve line along an inner side of the periphery of the depression.

* * * * *